United States Patent
NakaMats

(10) Patent No.: US 12,129,022 B2
(45) Date of Patent: Oct. 29, 2024

(54) AERIAL VEHICLE SUCH AS HIGH SPEED DRONE

(71) Applicant: Dr. NakaMats Innovation Institute, Tokyo (JP)

(72) Inventor: Yoshiro NakaMats, Tokyo (JP)

(73) Assignee: DR. NAKAMATS INNOVATION INSTITUTE, Tokyo (JP)

( * ) Notice: Subject to any disclaimer, the term of this patent is extended or adjusted under 35 U.S.C. 154(b) by 0 days.

(21) Appl. No.: 17/043,899

(22) PCT Filed: Mar. 22, 2019

(86) PCT No.: PCT/JP2019/012261
§ 371 (c)(1),
(2) Date: Nov. 23, 2020

(87) PCT Pub. No.: WO2019/188849
PCT Pub. Date: Oct. 3, 2019

(65) Prior Publication Data
US 2021/0070431 A1    Mar. 11, 2021

(30) Foreign Application Priority Data
Mar. 31, 2018  (JP) .................................. 2018-070484

(51) Int. Cl.
*B64C 27/26*    (2006.01)
*B64C 29/00*    (2006.01)
(Continued)

(52) U.S. Cl.
CPC .......... *B64C 27/26* (2013.01); *B64C 29/0025* (2013.01); *B64U 10/25* (2023.01);
(Continued)

(58) Field of Classification Search
CPC ........ B64C 2201/021; B64C 2201/042; B64C 2201/088; B64C 2201/108;
(Continued)

(56) References Cited

U.S. PATENT DOCUMENTS 1,845,307 A * 2/1932 Maxwell ................. B64C 3/385
244/7 C
2,328,786 A * 9/1943 Crowder ................. B64C 29/02
244/7 B
(Continued)

FOREIGN PATENT DOCUMENTS

JP    2009-143268    7/2009
JP    2016-517821    6/2016
(Continued)

OTHER PUBLICATIONS

International Search Report dated May 7, 2019 in International (PCT) Application No. PCT/JP2019/012261.

*Primary Examiner* — Medhat Badawi
(74) *Attorney, Agent, or Firm* — Wenderoth, Lind & Ponack, L.L.P.

(57) ABSTRACT

By providing propellers for vertical ascent and descent and for horizontal flight, and a blade for horizontal flight, it is possible to obtain an aerial vehicle capable of high-speed horizontal flight and capable of flying a long distance.

8 Claims, 16 Drawing Sheets

(51) Int. Cl.
  *B64U 10/25* (2023.01)
  *B64U 30/12* (2023.01)
  *B64U 30/299* (2023.01)
  *B64U 50/13* (2023.01)
  *B64U 50/31* (2023.01)

(52) U.S. Cl.
  CPC ............ *B64U 30/12* (2023.01); *B64U 30/299* (2023.01); *B64U 50/13* (2023.01); *B64U 50/31* (2023.01)

(58) Field of Classification Search
  CPC ... B64C 2201/104; B64C 27/24; B64C 27/26; B64C 29/0025; B64C 29/0033; B64C 29/00; B64C 39/005; B64C 39/024; B64U 10/25; B64U 30/20; B64U 50/19; B64U 70/80; B64U 10/13; B64U 30/10; B64U 50/13
  See application file for complete search history.

(56) References Cited

U.S. PATENT DOCUMENTS

| | | | | |
|---|---|---|---|---|
| 2,444,781 A * | 7/1948 | Leonard | B64C 29/02 244/7 B |
| 2,479,125 A * | 8/1949 | Leonard | B64C 29/0075 244/7 B |
| 2,708,081 A * | 5/1955 | Dobson | B64C 29/0033 244/7 C |
| 2,814,451 A * | 11/1957 | Turner | B64C 29/0033 244/7 R |
| 3,035,789 A * | 5/1962 | Young | B64C 29/0033 244/7 C |
| 3,081,964 A * | 3/1963 | Quenzler | B64C 29/0033 244/7 R |
| 3,106,369 A * | 10/1963 | Borst | B64C 29/0033 244/7 R |
| 3,116,040 A * | 12/1963 | Petrides | B64C 27/18 244/17.13 |
| 3,141,633 A * | 7/1964 | Mackay | B64C 29/0033 244/7 C |
| 3,259,343 A * | 7/1966 | Roppel | B64C 29/0091 244/53 R |
| 3,298,633 A * | 1/1967 | Dastoli | B64D 5/00 244/2 |
| 3,499,620 A * | 3/1970 | Sturm | B64C 29/0033 244/55 |
| 3,567,157 A * | 3/1971 | Dancik | B64C 29/0033 244/7 C |
| 3,606,210 A * | 9/1971 | Busby | B64C 29/0075 244/12.4 |
| 3,618,875 A * | 11/1971 | Kappus | B64C 29/0025 244/12.3 |
| 3,666,209 A * | 5/1972 | Taylor | B64C 29/0033 244/7 C |
| 4,492,353 A * | 1/1985 | Phillips | B64C 29/0075 244/12.4 |
| 4,979,698 A * | 12/1990 | Lederman | B64C 29/0033 244/17.13 |
| 4,982,914 A * | 1/1991 | Eickmann | B64C 11/28 244/54 |
| 5,381,985 A * | 1/1995 | Wechsler | B64C 11/48 244/12.4 |
| 5,419,514 A * | 5/1995 | Ducan | B64C 29/0033 244/12.4 |
| 5,823,468 A * | 10/1998 | Bothe | B64B 1/18 244/2 |
| 5,839,691 A * | 11/1998 | Lariviere | B64C 29/0033 244/7 R |
| 6,655,631 B2 * | 12/2003 | Austen-Brown | B64D 25/00 244/12.4 |
| 7,118,066 B2 * | 10/2006 | Allen | B64C 29/0033 244/7 B |
| 7,861,967 B2 * | 1/2011 | Karem | B64C 29/0033 244/12.4 |
| 7,874,513 B1 * | 1/2011 | Smith | B64C 29/0033 244/12.4 |
| 7,997,526 B2 * | 8/2011 | Greenley | A63H 27/02 244/7 B |
| 8,070,090 B2 * | 12/2011 | Tayman | B64C 39/024 244/7 C |
| 8,152,096 B2 * | 4/2012 | Smith | B64C 29/0033 244/60 |
| 9,187,175 B1 * | 11/2015 | Chen | B64C 39/08 |
| 9,387,929 B2 * | 7/2016 | Gaillimore | B64C 39/12 |
| 9,475,579 B2 * | 10/2016 | Fredericks | B64C 29/0033 |
| 9,567,075 B2 * | 2/2017 | Tighe | B64C 29/02 |
| 9,623,967 B2 * | 4/2017 | Mallard | B64C 29/0033 |
| 9,764,828 B2 * | 9/2017 | Ulrich | B64C 31/00 |
| 9,878,788 B2 * | 1/2018 | Blue | B64C 37/00 |
| 9,957,042 B1 * | 5/2018 | Vander Lind | B64C 11/28 |
| 9,975,631 B1 * | 5/2018 | McLaren | B64C 27/28 |
| 10,046,855 B2 * | 8/2018 | Bevirt | B64C 29/0008 |
| 10,112,707 B1 * | 10/2018 | Howard | B64C 39/024 |
| 10,246,184 B2 * | 4/2019 | Ragland | B64C 3/32 |
| 10,252,798 B2 * | 4/2019 | Petrov | B64C 37/00 |
| 10,315,760 B2 * | 6/2019 | Bevirt | B64C 27/28 |
| 10,322,799 B2 * | 6/2019 | McCullough | B64D 17/025 |
| 10,343,773 B1 * | 7/2019 | McCullough | B64D 1/08 |
| 10,370,082 B2 * | 8/2019 | Har | B64C 3/385 |
| 10,392,106 B2 * | 8/2019 | Vondrell | B64D 27/12 |
| 10,392,107 B2 * | 8/2019 | Har | B64C 39/024 |
| 10,407,168 B2 * | 9/2019 | Hutson | B64C 39/024 |
| 10,442,541 B2 * | 10/2019 | Miller | B64D 27/12 |
| 10,538,327 B2 * | 1/2020 | High | G06Q 10/0832 |
| 10,597,164 B2 * | 3/2020 | Oldroyd | G05D 1/0072 |
| 10,618,646 B2 * | 4/2020 | McCullough | B64C 27/32 |
| 10,618,647 B2 * | 4/2020 | McCullough | B64C 39/02 |
| 10,625,852 B2 * | 4/2020 | Bevirt | B64C 29/0033 |
| 10,661,892 B2 * | 5/2020 | McCullough | B64C 25/36 |
| 10,696,384 B2 * | 6/2020 | Shiosaki | B64C 39/024 |
| 10,696,391 B2 * | 6/2020 | Ewing | B64C 27/28 |
| 10,737,765 B2 * | 8/2020 | Oldroyd | B64C 29/02 |
| 10,737,778 B2 * | 8/2020 | Oldroyd | B64C 1/32 |
| 10,752,350 B2 * | 8/2020 | McCullough | B64C 29/0025 |
| 10,752,352 B2 * | 8/2020 | Brand | B64C 27/28 |
| 10,807,707 B1 * | 10/2020 | Ter Keurs | B64D 9/00 |
| 10,850,835 B2 * | 12/2020 | Hutson | B64C 39/024 |
| 10,870,487 B2 * | 12/2020 | McCullough | B64D 25/12 |
| 10,919,641 B2 * | 2/2021 | Mikic | B64D 43/02 |
| 10,960,785 B2 * | 3/2021 | Villanueva | H01M 10/658 |
| 10,967,967 B2 * | 4/2021 | Kawiecki | B64C 39/024 |
| 10,974,827 B2 * | 4/2021 | Bevirt | B64C 29/0033 |
| 2003/0080242 A1 * | 5/2003 | Kawai | F02K 3/025 244/12.4 |
| 2006/0016930 A1 * | 1/2006 | Pak | B64D 35/04 244/12.4 |
| 2007/0187547 A1 * | 8/2007 | Kelly | B64B 1/30 244/7 R |
| 2008/0048065 A1 * | 2/2008 | Kuntz | B64C 39/024 244/17.23 |
| 2011/0001001 A1 * | 1/2011 | Bryant | B64C 29/0033 244/12.5 |
| 2011/0001020 A1 * | 1/2011 | Forgac | B64C 39/024 244/7 A |
| 2011/0042510 A1 * | 2/2011 | Bevirt | B64C 29/0033 244/12.4 |
| 2011/0168835 A1 * | 7/2011 | Oliver | B64D 27/12 244/12.4 |
| 2011/0303795 A1 * | 12/2011 | Oliver | B64C 29/0033 244/7 R |
| 2011/0315809 A1 * | 12/2011 | Oliver | B64D 27/06 244/12.4 |
| 2012/0248259 A1 * | 10/2012 | Page | B64C 29/02 244/7 A |
| 2014/0008498 A1 * | 1/2014 | Reiter | B64C 29/00 244/7 A |
| 2015/0014475 A1 * | 1/2015 | Taylor | B64D 27/24 244/6 |

(56) References Cited

U.S. PATENT DOCUMENTS

| | | | |
|---|---|---|---|
| 2015/0344134 A1* | 12/2015 | Cruz Ayoroa | B64C 39/12 |
| | | | 244/48 |
| 2016/0288903 A1* | 10/2016 | Rothhaar | B64C 29/0033 |
| 2017/0203839 A1* | 7/2017 | Giannini | B64D 27/24 |
| 2017/0203843 A1* | 7/2017 | Chan | B64C 39/024 |
| 2017/0320574 A1* | 11/2017 | Richardson | G05D 1/0011 |
| 2018/0273168 A1* | 9/2018 | Page | B64C 27/22 |
| 2019/0071174 A1* | 3/2019 | Burigo | B64C 29/0016 |
| 2019/0291863 A1* | 9/2019 | Lyasoff | B64D 31/06 |
| 2020/0164976 A1* | 5/2020 | Lovering | B64C 29/0033 |
| 2021/0016877 A1* | 1/2021 | Hohenthal | B64C 1/069 |

FOREIGN PATENT DOCUMENTS

| | | |
|---|---|---|
| JP | 2017-528355 | 9/2017 |
| WO | 2015/012935 | 1/2015 |
| WO | 2016/028358 | 2/2016 |

\* cited by examiner

[Fig. 1]
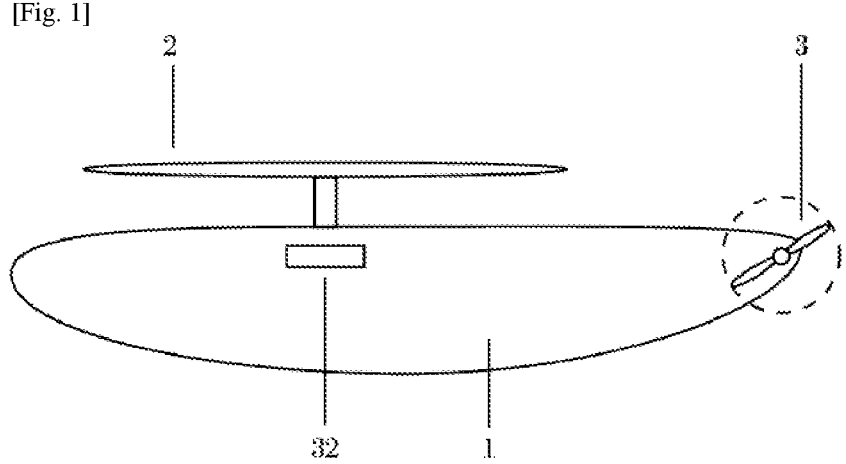
[Fig. 2]
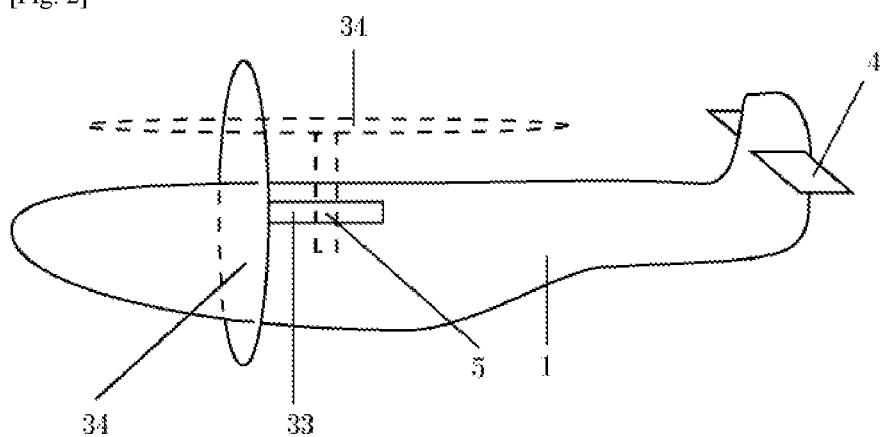

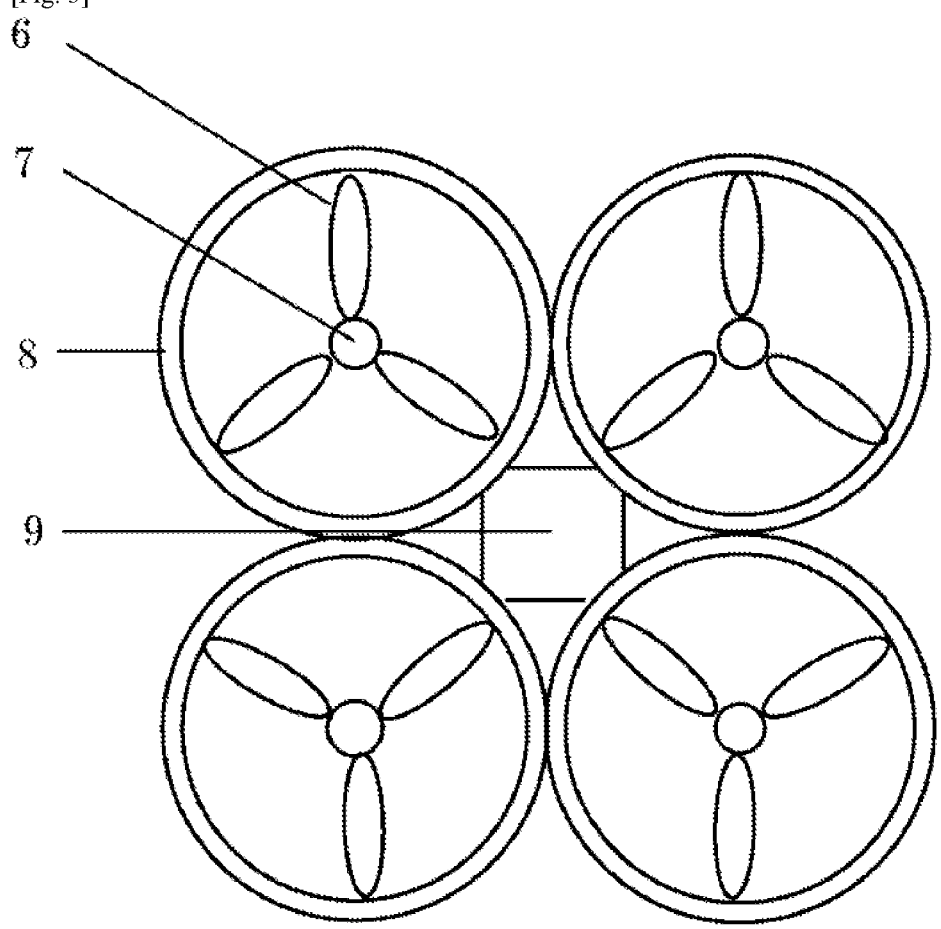
[Fig. 3]

[Fig. 4]
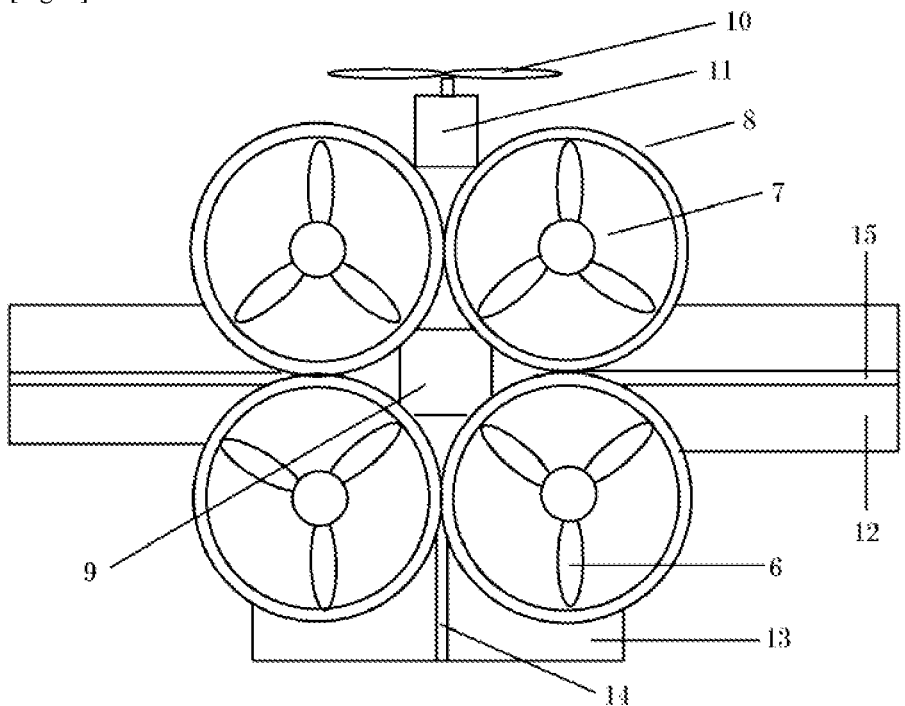
[Fig. 5]
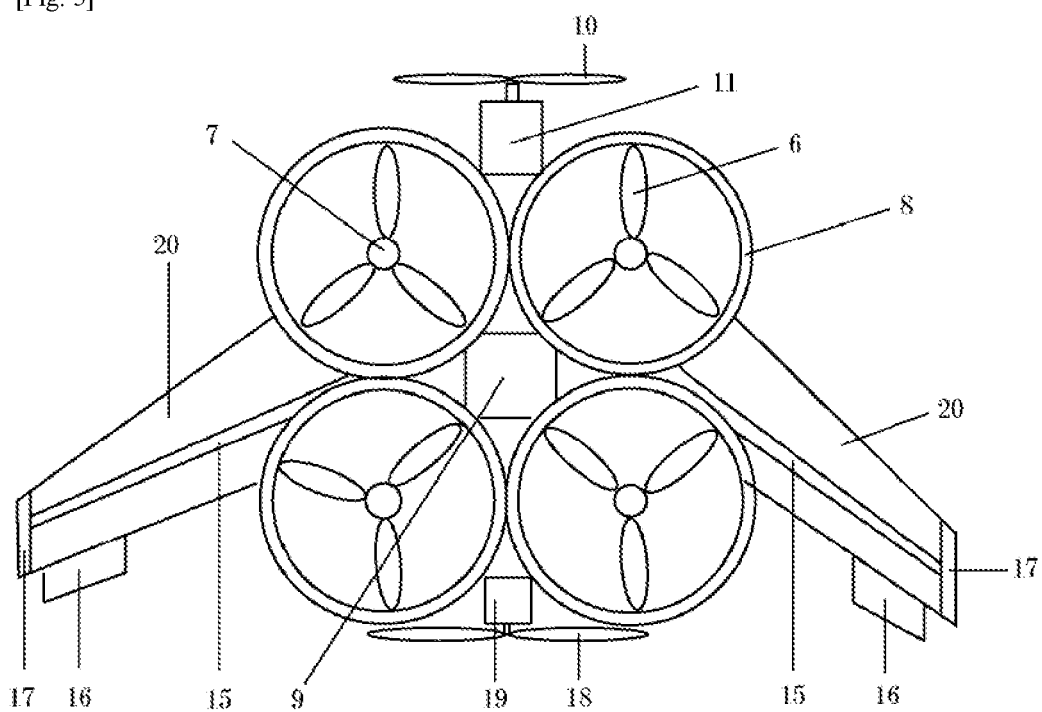

[Fig. 6]
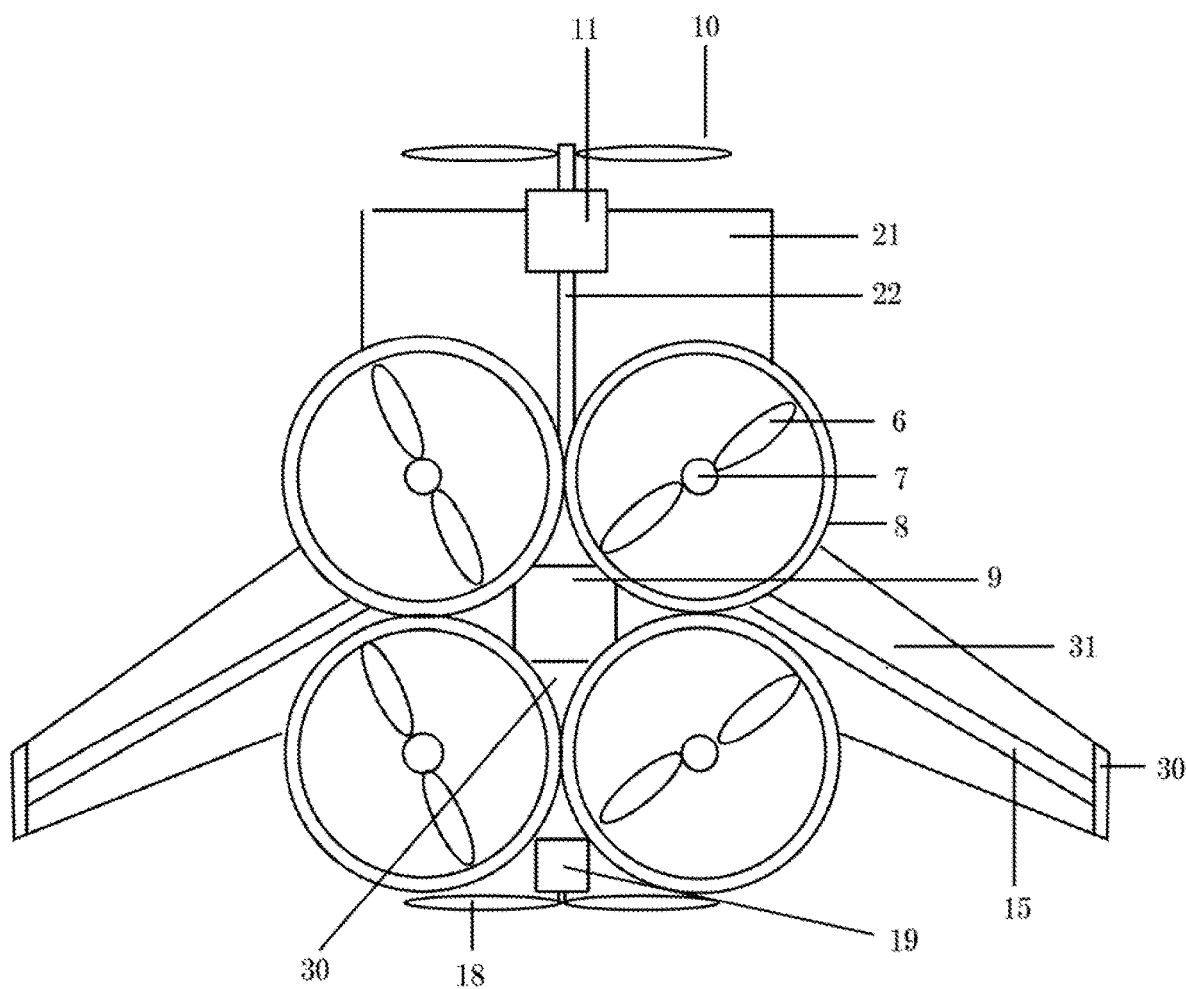

[Fig. 7]
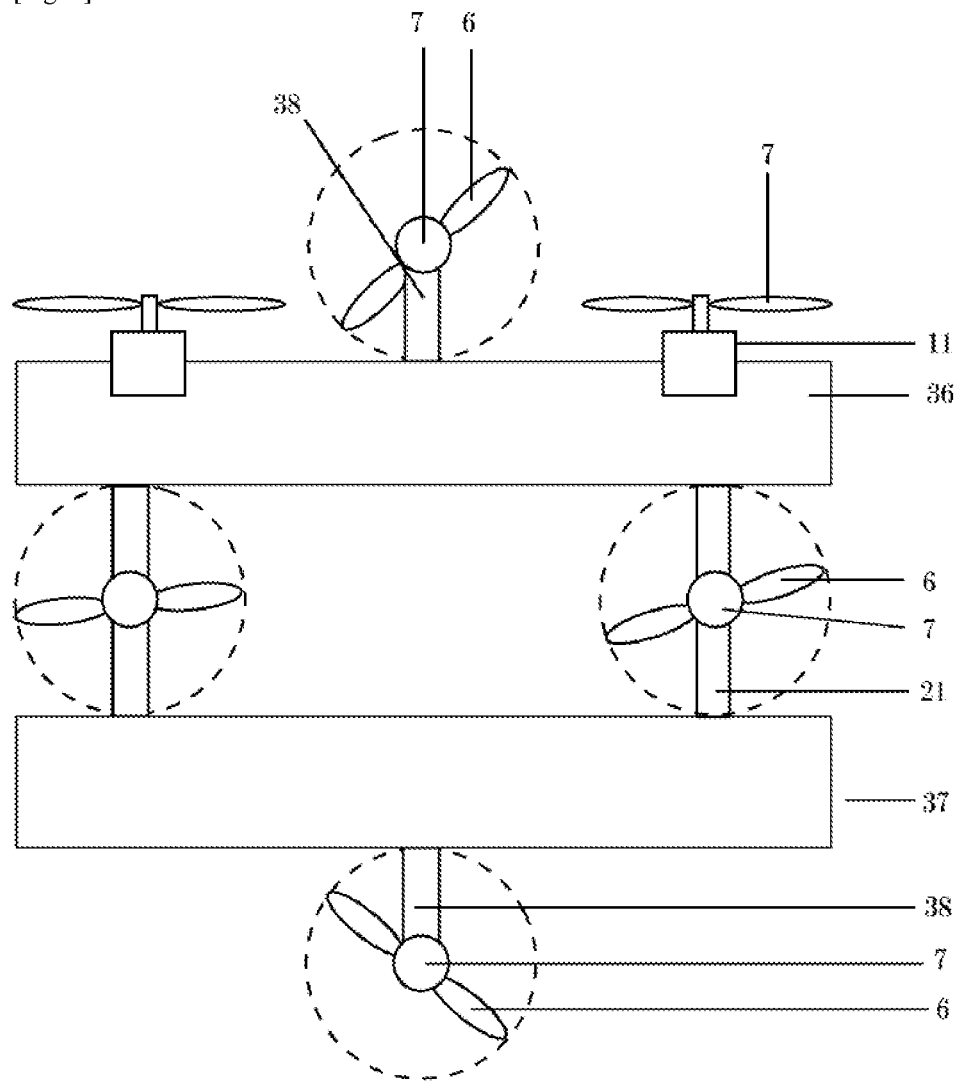

[Fig. 8]
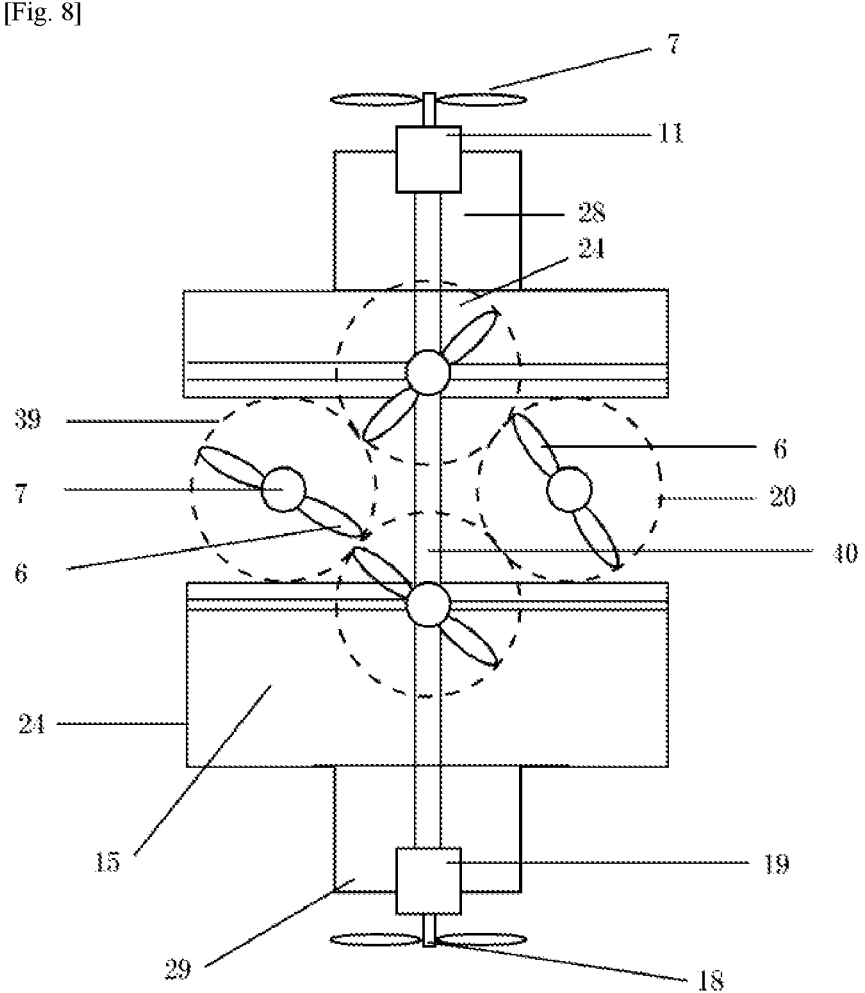

[Fig. 9]
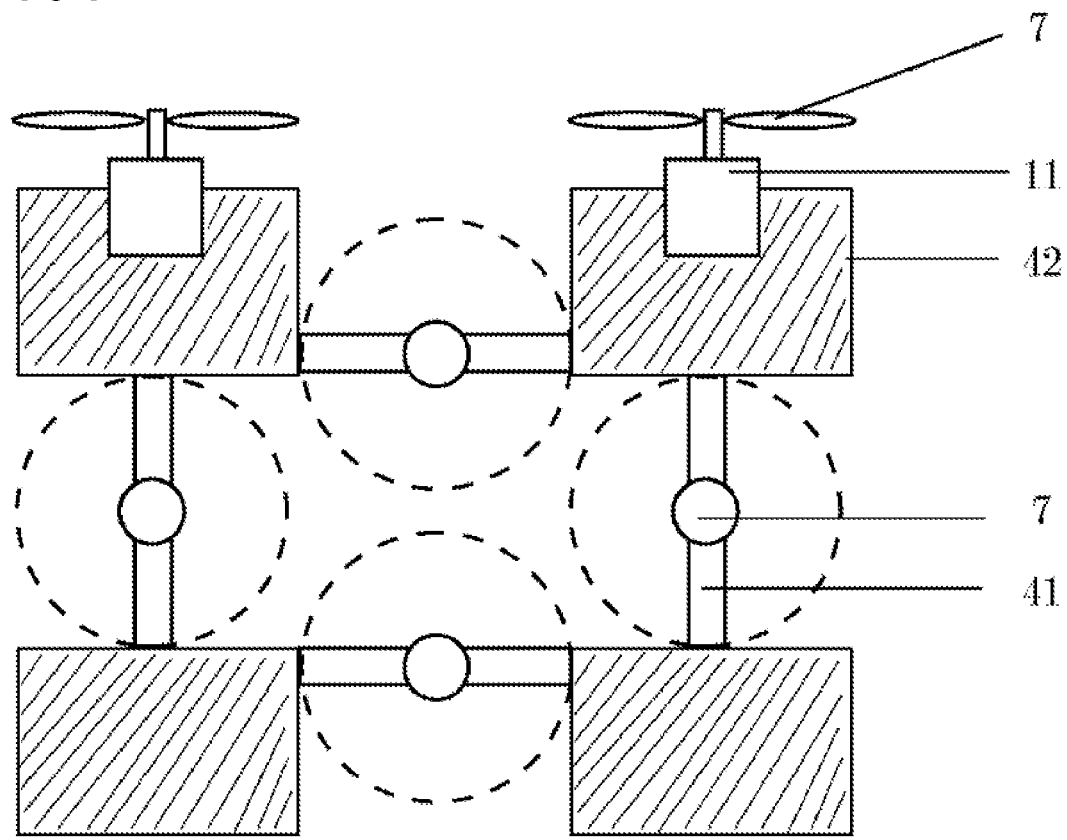
[Fig. 10]
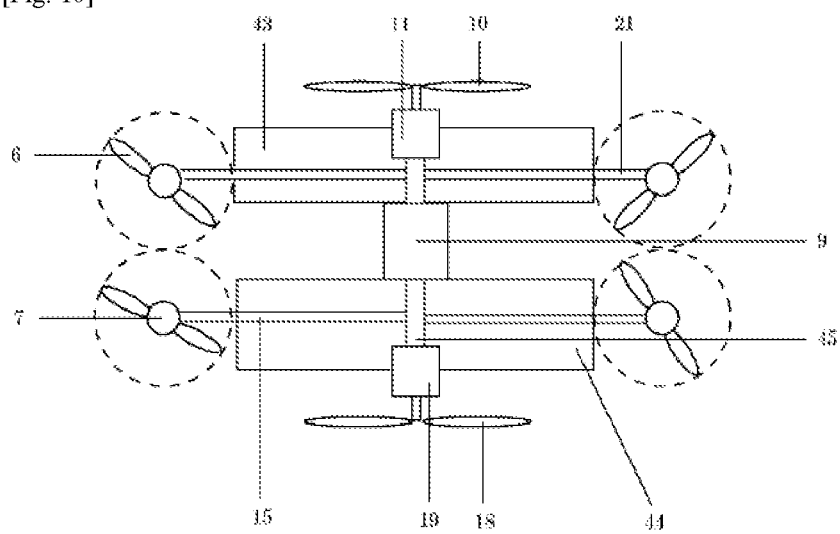

[Fig. 11]
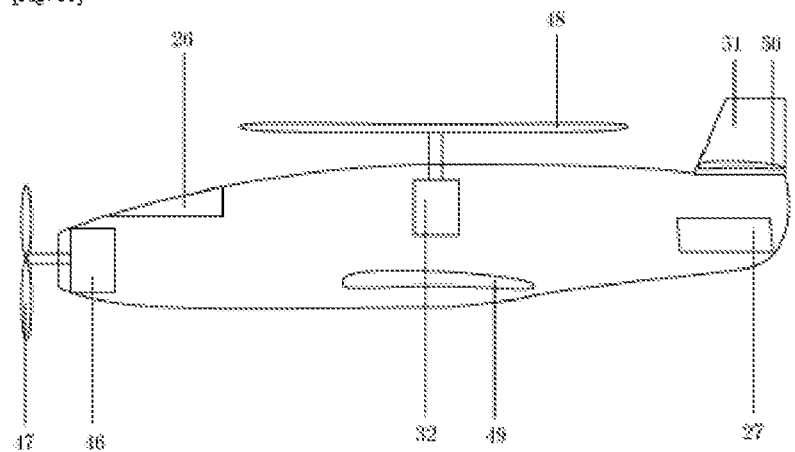
[Fig. 12]
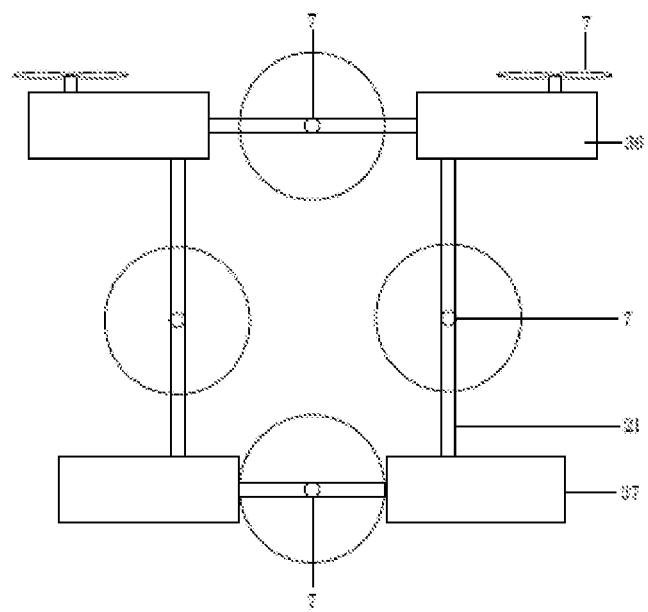

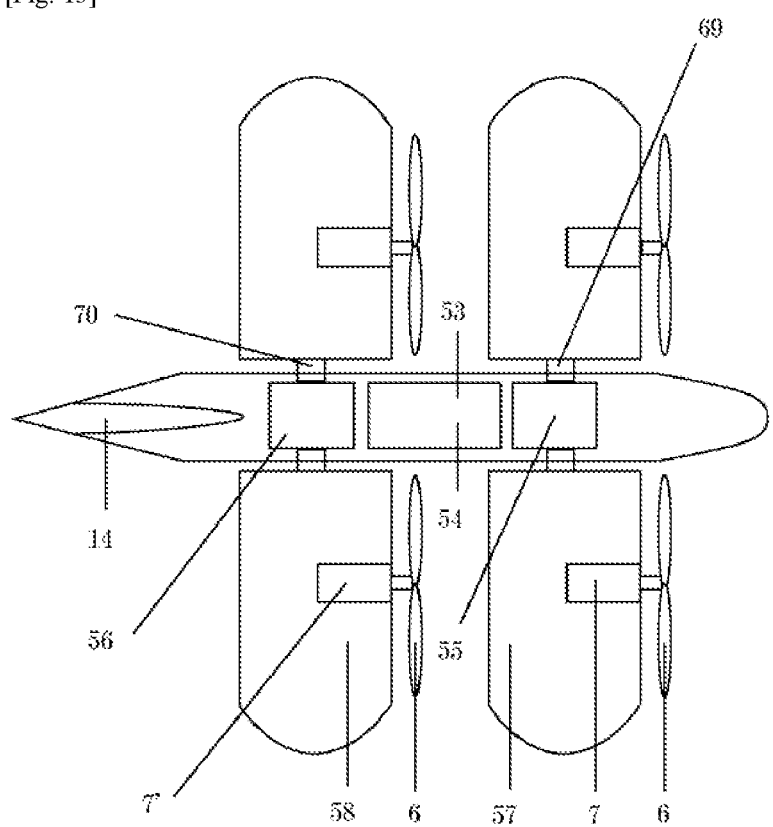
[Fig. 13]

[Fig. 14]
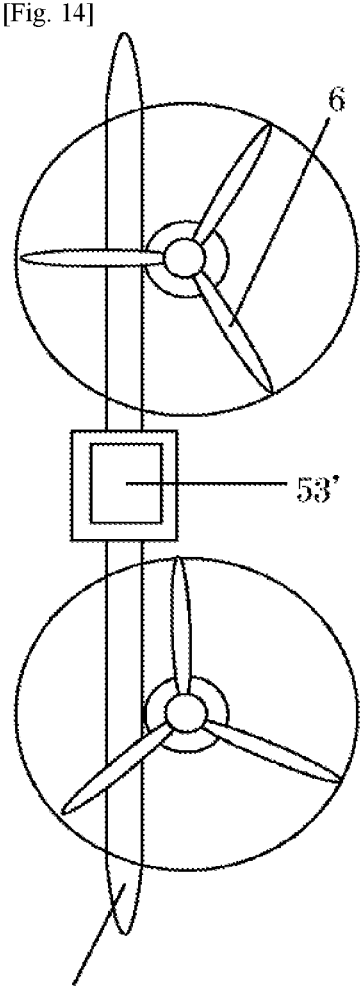
57
[Fig. 15]
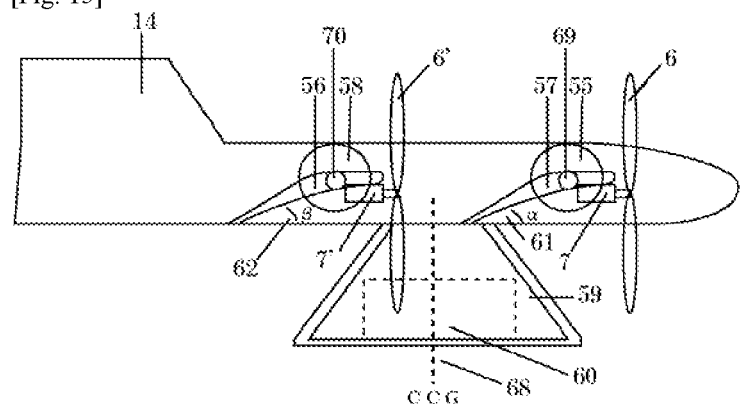

[Fig. 16]
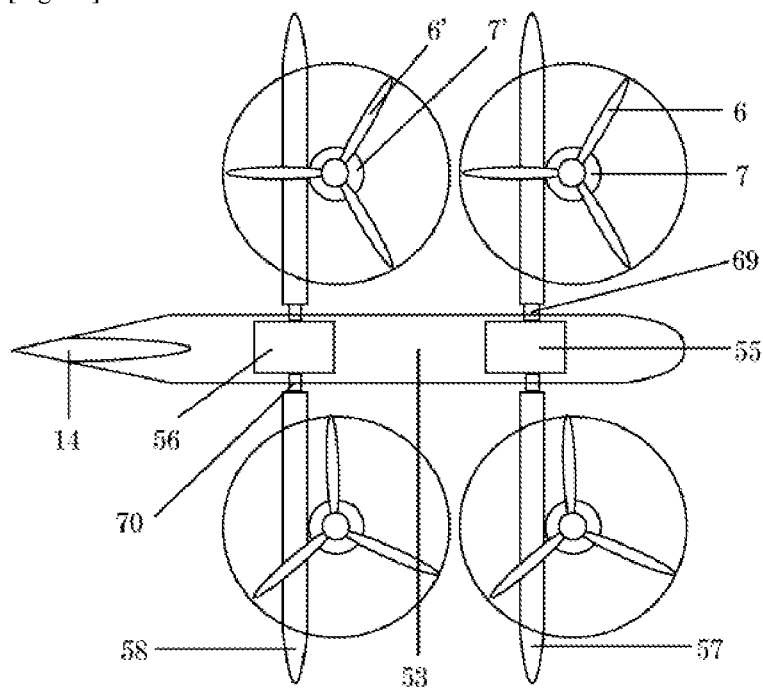

[Fig. 17]
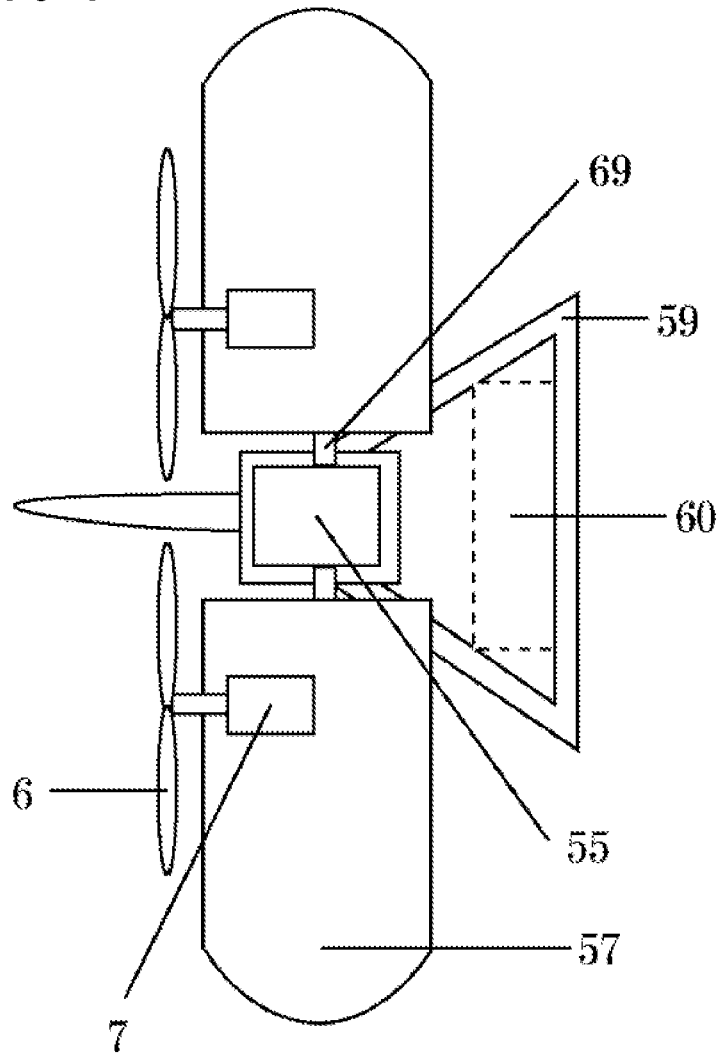
[Fig. 18]
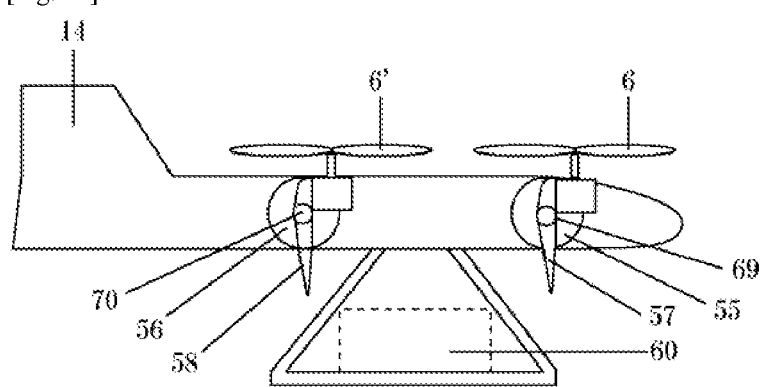

[Fig. 19]
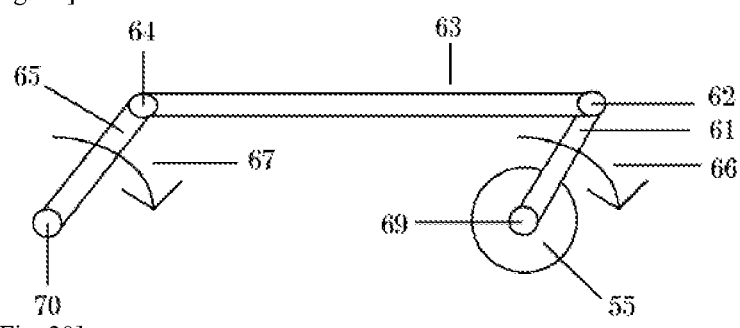
[Fig. 20]
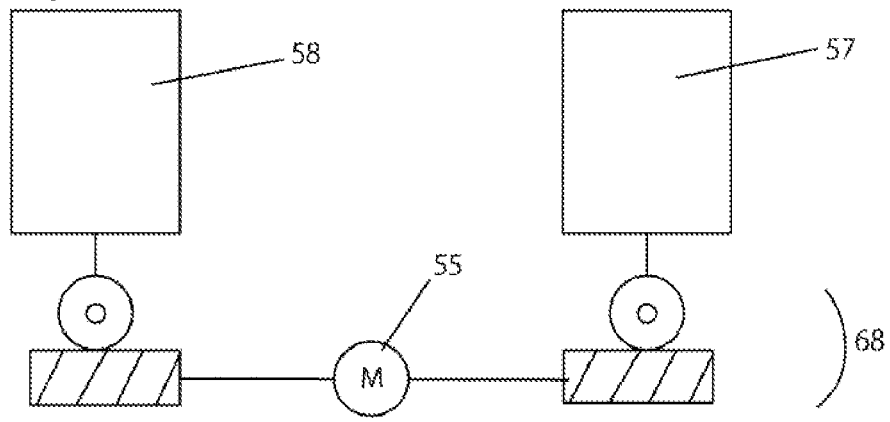

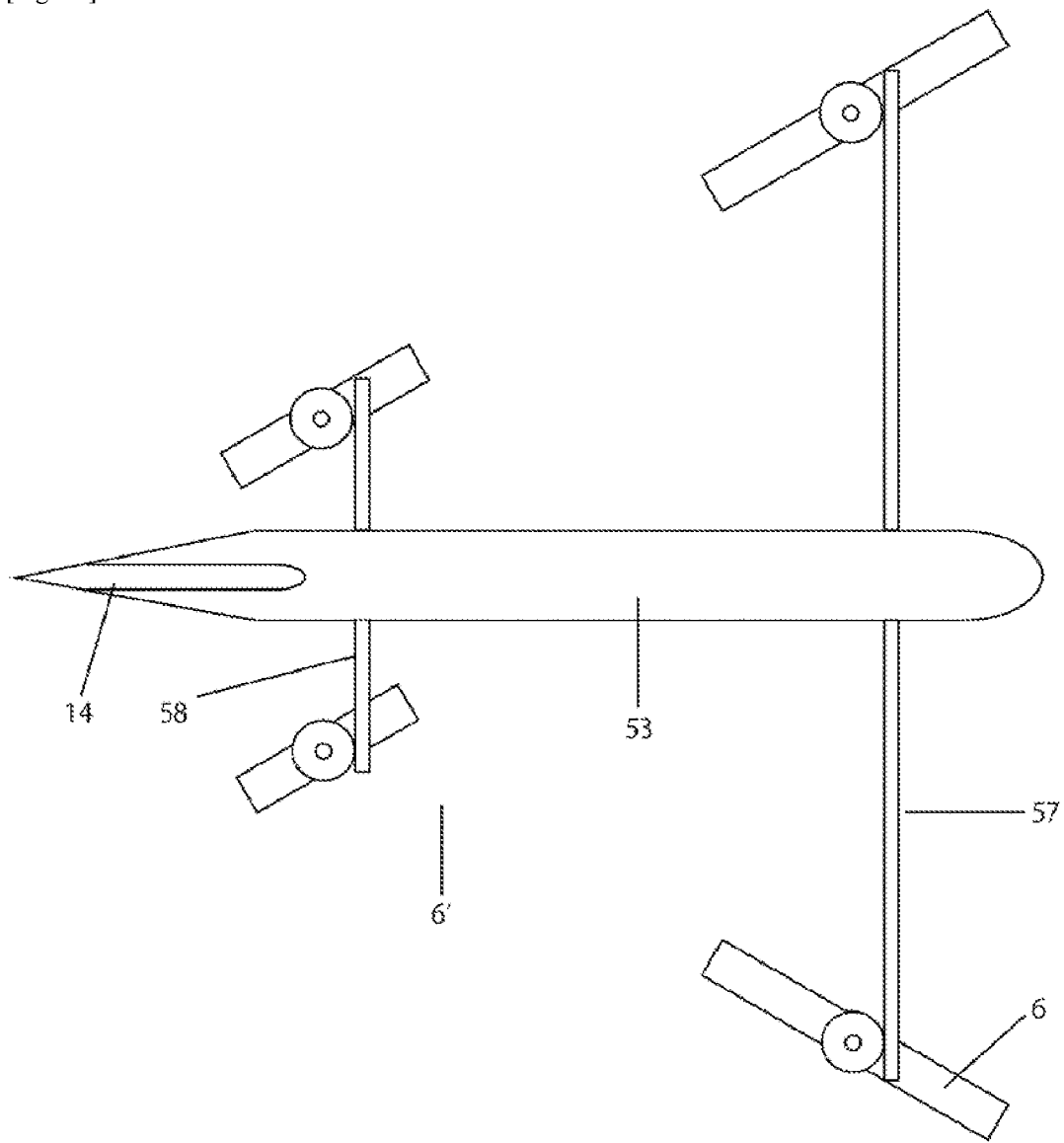
[Fig. 21]

[Fig. 22]
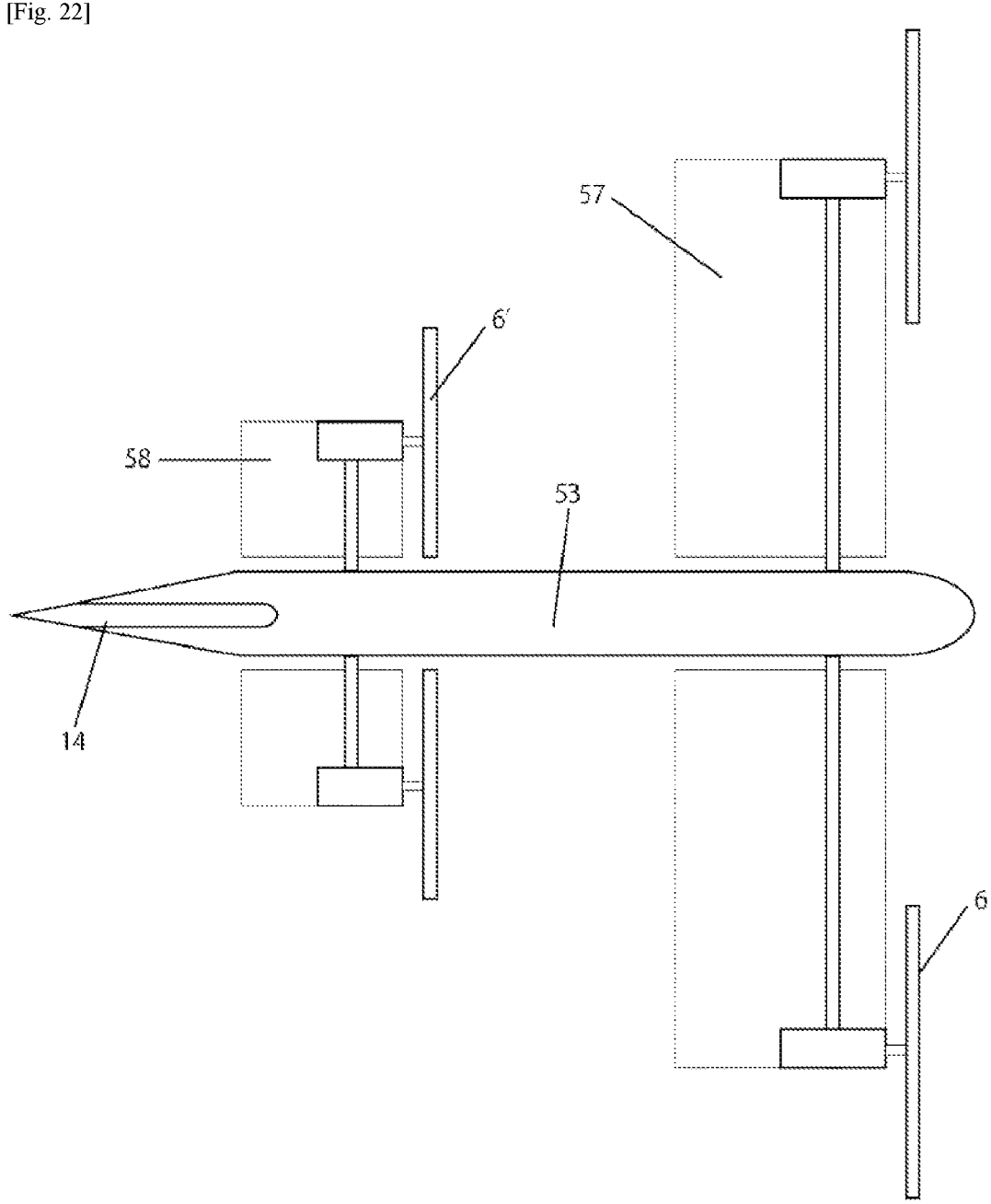

[Fig. 23]
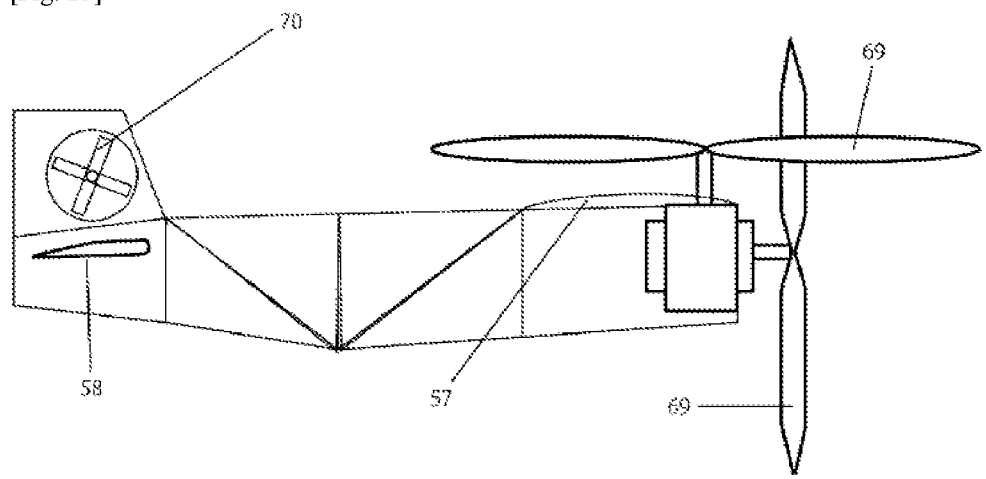
[Fig. 24]
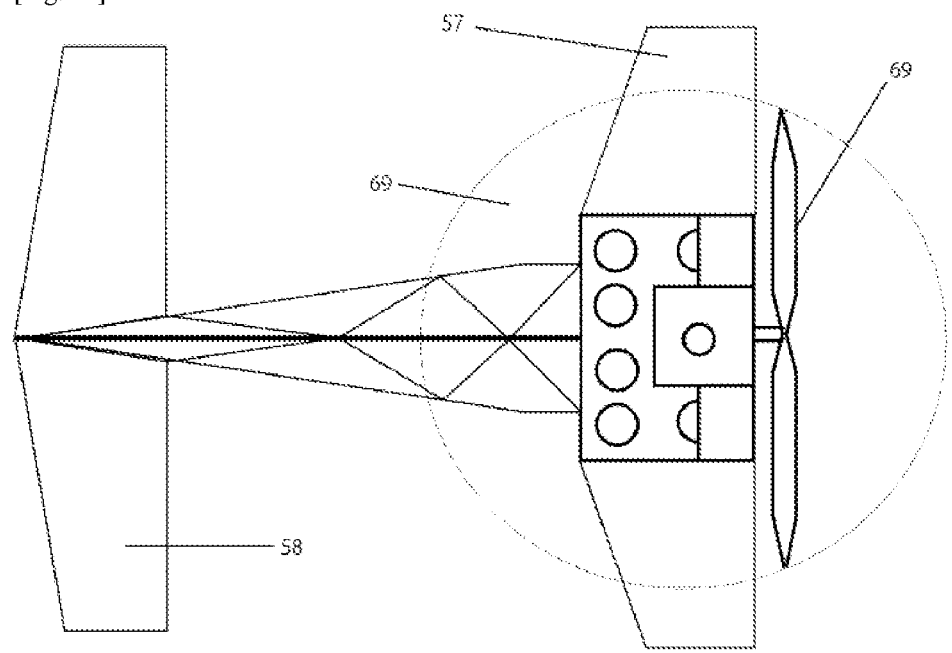

AERIAL VEHICLE SUCH AS HIGH SPEED DRONE

TECHNICAL FIELD

The present invention is related to aerial vehicles, of a new type of drone and the like that can land and take off vertically, and also fly horizontally at a high speed.

BACKGROUND TECHNOLOGY

Normal airplanes run down the runway until they reach the requisite speed at which to take off. Conversely, in the case of landings, normal airplanes require a runway from the moment at which they touch down to when they halt to a stop. A runway with a general distance of about 1.5 km to 3 km is required. Hence, in this case, VTOL (vertical take-off and landing) is required. Helicopters, Ospreys, drones and the like are known as this type of airplane. In the case of a helicopter, as shown in FIG. 1, the propeller is used for hovering, ascending, descending, and horizontal (lateral) flight. In FIG. 1, 1 is a fuselage, 3 is a tail rotor, and 32 is a motor for propeller rotation.

Since helicopters have a slow horizontal speed, Ospreys with fast horizontal speeds were developed (FIG. 2). Ospreys were invented in 1953 by the inventor concerned herein. This was then taught to Lawrence Bell, CEO of Bell Aircraft Co., to which Bell Aircraft Co. finally commercialized in recent years. A propeller that can control tilt is provided on both ends of the main wing; by controlling the tilt angle of the propeller, hovering and horizontal flight are enabled. To perform ascending and forward-moving operations, the tilt angle of the propeller changes from 0° to 90°. However, when the rotor is changed to a horizontal position or a vertical position, many accidents tend to occur. In FIG. 2, 1 is a fuselage, 34 is a propeller for Osprey ascent, descent and forward-moving movements, 4 is a horizontal tail fin, 5 is a rotation axis for an Osprey engine, and 33 is an engine for an Osprey propeller. FIG. 3 is a well-known drone, and was invented in 1940, and has become popular in recent years. In FIG. 3, 6 is a drone propeller, 7 is a drone ascent and descent motor, 8 is a drone propeller guide, and 9 is a receiver/camera and the like.

SUMMARY OF THE INVENTION

Topics the Invention Attempt to Solve

As described prior, at a place without a runway, an airplane cannot land and take off. A normal airplane has a limitation in that it does not have the ability for vertical landing, vertical take-off, and hovering. In order to solve such problems, an aircraft with vertical landing, vertical take-off, and hovering functions were considered. A helicopter is an aircraft that has vertical landing, vertical take-off, and hovering functions and plays an active role in saving lives in shipwreck and disasters in mountains, but has a slow horizontal flight speed and a short cruising distance, as well as a small loading cargo volume; hence an aircraft that replaces a helicopter has been asked for.

In the case of an Osprey-type aircraft, at the time of vertical take-off and landing, the airflow given off by the propeller beats against its wings, thus making it very aerodynamically inefficient. Moreover, a drone as in FIG. 3 is well-known but has a slow horizontal flight speed, cannot fly long distances, can turn upside down by way of horizontal wind, and is not weathered for all-weather type, as such it is not suited for the load delivery that Amazon and the like are planning for, as well as for fast transportation.

Means to Solve the Topics

The present invention solves the issues described above and is configured to be equipped with a propeller for vertical ascent, descent, forward-moving, and a stability wing for horizontal flight. This is different to an auto-gyro which cannot perform vertical ascent and descent.

Effect of the Present Invention

The present invention provides an airplane that can achieve vertical take-off and landing, fly high-speed across long distances and safely fly in direct horizontal wind, use a small amount of energy for long distances, hold a larger loading volume, be used in all-weather types, perform vertical take-off, landing, and hovering safely, prevent wing power less in which the propeller beats against its wings during take-off, forego the use of a tilt rotor, have a much simpler control structure, avoid accidents, be easier to produce at a lower cost, and be used for shipment deliveries, delivering packages efficiently, accurately, and with high-speed. The present invention is an epoch-making invention that will result in significant industrial time-saving with great effect.

BRIEF EXPLANATION OF EACH FIGURE

FIG. 1 Side view drawing of a well-known helicopter

FIG. 2 Side view drawing of a well-known tilt rotor type (Osprey)

FIG. 3 Plan view drawing of a well-known drone

FIG. 4 Plan view drawing showing an embodiment as a drone of the present invention FIG. 5 Plan view drawing of a drone without a tail fin showing the $2^{nd}$ embodiment of the present invention FIG. 6 Plan view drawing of a canard type showing the $3^{rd}$ embodiment of the present invention FIG. 7 Plan view drawing of a tandem type airplane showing the $4^{th}$ embodiment of the present invention FIG. 8 Plane view drawing of the $5^{th}$ embodiment of the present invention FIG. 9 Solar plane of the $6^{th}$ embodiment of the present invention FIG. 10 $7^{th}$ embodiment of the present invention FIG. 11 Twin engine type of $8^{th}$ embodiment of the present invention FIG. 12 Side view drawing of $9^{th}$ embodiment (real airplane) of the present invention FIG. 13 Top view drawing of $10^{th}$ embodiment of the present invention in which wings are arranged horizontally FIG. 14 Front side view drawing of the same as above FIG. 15 Flank side view drawing the same as above FIG. 16 Top view drawing of $10^{th}$ embodiment of the present invention in which wings are arranged vertically FIG. 17 Front side view drawing of the same as above FIG. 18 Flank side view drawing of the same as above FIG. 19 Side view drawing of drive mechanism in which the same wing rotation motor as above is one piece FIG. 20 Conceptual drawing of the present invention using a bevel gear, by which the wing of the present invention is rotated FIG. 21 Ascent and descent time of the embodiment of the present invention in which the subsequent impact of the front propeller is not received by the rear propeller FIG. 22 Horizontal airplane of the same as above FIG. 23 Side view drawing of the embodiment of the present invention of single tilt main rotor type FIG. 24 Top view drawing of the same as above

CONFIGURATIONS TO IMPLEMENT THE PRESENT INVENTION

The present invention is an aircraft of a new invention that provides a new vertical take-off and touch down type of aircraft (new VTOL) in which ascent and descent propellers and forward-moving propellers and rotating or non-rotating horizontal flight wings are provided, vertical take-off, touch down, and hovering are naturally enabled, horizontal flight speed is fast, energy loss is small, long-distance flight is enabled, and is all-weathered and can safely fly in bad weather conditions. The present invention is a concept different from a traditional drone, helicopter, Osprey, or auto-gyro.

FIG. 4 is a plan view of the $1^{st}$ embodiment of the aerial vehicle invented by the present inventor. In the figure, 13 is a horizontal tail fin, 14 is a vertical tail fin, 10 is a forward-moving propeller. 12 is a horizontal flight main wing which is supported by an ascent propeller guard, 8 is a main wing girder 15, and 6 is a propeller for ascent, descent, and hovering. The main wings 12 and main wing girder 15 are provided as a pair on the right and left of the propeller guard 8. 14 is a horizontal tail fin provided in the rear of propeller guard 8. 13 is a steering vertical tail fin_supported by a propeller guard 8. 7 is a motor that enables a propeller for hovering 6 to rotate. 9 is a filming camera, an electronic circuit, battery and the like. The aerial vehicle of the present invention is a $1^{st}$ embodiment of the present invention in which a main wing 12, a tail fin 13 and a forward-moving propeller 10 are provided without interfering with an ascent propeller; horizontal flight speed can be accelerated; and a propeller guard 8, a forward-moving propeller 10, a rotation motor 11, a main wing 12 and tail fins 13, 14 are structurally supported and shared.

FIG. 5 is a plan view drawing of a drone without a tail fin showing the $2^{nd}$ embodiment of the present invention. A wing girder 15, a main wing 20, an ascent descent rudder 16, a wing tip vertical direction arm 17, and in the back, a push propeller 18, a drive motor 19 are provided. The main gist of the present invention is as explained in FIG. 4.

FIG. 6 is an embodiment of a canard type of the present invention, and comprised of a canard girder 22 supported by a propeller guard 8 and the canard 21 supported by a propeller guard 8, and a propeller motor 11, a pull propeller 10, a main wing girder 35 and a main wing 31 supported by a propeller guard 8, and a drive motor 19 of a push type propeller 18 supported by propeller guard 8, a vertical tail fin 30 at the main wing tip, and a camera 9.

FIG. 7 is the $4^{th}$ embodiment of the present invention in which without providing a propeller guard, two main wings 36, 37 are used as a propeller guard, and this tandem type aerial vehicle is such that the front wing 36 and the back wing 37 are made a tandem type with the same size. That is, the invention is such that an ascent and descent propeller 6 and a motor 7 are provided between both wings, and the main wings 36, 37 guard the rotation of the propeller 6. 38 is a support beam of the descent and ascent propeller motor 7 provided outside of the wing. Of course, when the number of propellers is decreased or increased, this is included in the invention.

FIG. 8 is the $5^{th}$ embodiment of the present invention, and all of the four vertical rotation track of the propellers 20, 39 are inscribed, and without providing a propeller guard, 4 pieces of main wing 24, canard 28 and tail fin 6 are used for the propeller guard. 40 is a beam that joins four propeller motors 7.

FIG. 9 is the $6^{th}$ embodiment of the present invention, and a propeller motor 7 and a main wing 42 are mounted on the square frame 41 and although it is similar to FIG. 8, this is an embodiment in which 4 pieces of main wings are made into a solar panel 42. It can fly without limit using solar energy, and can send energy using microwaves to earth.

FIG. 10 is the $7^{th}$ embodiment of the present invention, and the vertical (up and down) propeller 6 and a motor 7 are provided outside of the main wings 43, 44, and the embodiment simplifies the main wing structure. The operation of the aircraft and aerial vehicle configured as shown in FIG. 4, FIG. 5, FIG. 6, FIG. 7, FIG. 8, FIG. 9, FIG. 10 are explained as follows. In this case, first, the operator turns on a switch by, for example, remote control (not shown in figure), then the drone's ascent motor wirelessly 7, and the ascent propeller 6 starts to rotate, then the fuselage ascends to a specified altitude. Next, if the operator turns on the remote-control switch (not shown in figure), due to the rotation power of motors 11, 19, the forward-moving propeller 10 and push propeller 18 are rotated. Fuselage starts to move forward, and the hovering power is shared between the main wing 12 and tail fin 13 in FIG. 4, 20 in FIGS. 5, 21 and 31 in FIGS. 6, 36 and 37 in FIG. 7, 24, 28 in FIG. 8, 42 in FIG. 9, 43, 44 in FIG. 10, and during that time, the ascent propeller 6 and motor 7 are made to be idle. Thus, since this is able to arrive at its destination with a higher speed than well-known drones, shipment sales and the filming of remote places are superior to well-known drones. Next, the operation at touch down is explained. At touch down, the operator raises the rotation of all vertical propellers 6 and stops the rotation of the forward-moving propeller 10. In this condition, while the rotation of the vertical propellers 6 are being controlled, the vehicle touches down. According to the present invention, at touch down, the circuit and command of the tilt angle control of the propellers (refer to the control in FIG. 1) and the control change of the rotation number of a plural number of horizontal propellers of the drone are no longer necessary, thus the structure is simpler, and cost reduction and operation are simplified, and touch down operations can be executed safely and assuredly. Not only that, since a fixed wing is used for a horizontal flight, this enables a high-speed flight. Moreover, since the wings are used for a propeller guard, the structure is simpler and it is made lighter in weight.

FIG. 12 is a plan view drawing of the $9^{th}$ embodiment of the present invention. Two propellers 10 are provided for horizontal flight, and this enables a high-speed run, and also a long-distance move. For vertical descent and ascent, four pieces of propellers 6 are provided. 21 is a beam provided between engines 11; 53 is a beam that connects between the engines 11 and the mechanical parts 54, 55 is a beam that connects between mechanical parts 54, This invention can be used as an aerial vehicle that can accommodate a large number of people.

The above explains a drone. FIG. 11 is the $8^{th}$ embodiment of the present invention, and shows the side view of the real airplane in which people are seated. This is provided with a forward-moving engine 46, the same propeller 47, and a descent and ascent combined engine 32 and a rotor 48 on body 1 at the center of gravity. A vertical tail fin is 51, a horizontal tail fin is 50 and a cockpit is 26. Instead of the forward-moving propeller 47 and engine 46, in case a jet engine or rocket engine 27 are provided in the back also, this is included in the present invention. Moreover, in case the ascent and descent rotor 48 and the engine 32 are provided at the wing tip 8 also, this is included in the present invention. To make sure, there exists something called an autogyro. This has no ascent and descent engine and is entirely different from the present invention.

FIG. 13, 14, 15, 16, 17, 18 are the $10^{th}$ embodiment of the present invention. The embodiment is fundamentally different from those up to $9^{th}$ embodiment. Specifically, up to $9^{th}$ embodiment, wings were fixed and also, the forward-moving propellers were separately provided. But according to $10^{th}$ embodiment, wings are rotated, and a forward-moving propeller is not provided. Up to the $9^{th}$ embodiment, a wing is not positioned in the propeller slip stream part so that the slip stream of the ascent and descent propeller is not disturbed. In addition, a wing is fixed. Moreover, a forward-moving propeller and an ascent and descent propeller are provided separately. $10^{th}$ embodiment is an embodiment with an entirely different concept from those up to $9^{th}$ embodiment, and it is an embodiment that makes the present invention more efficient. Specifically, in order to streamline the structure, an ascent and descent propeller is provided on a wing, and in order to raise propeller efficiency without disturbing slip stream of the propeller by a wing, a wing is positioned at the right angle to the propeller, and if the axis direction of the propeller change, the wing direction rotates accordingly so that the slip steam of the propeller becomes the same direction as the wing surface direction, thus the propeller slip stream is not always disturbed by a wing. Moreover, without providing a forward-moving propeller, in order to combine it with a descent and ascent propeller, as written previously, a wing is rotated about 90°, and the propeller direction is rotated about 90°, and this is used as the forward-moving propeller. This is fundamentally different from an Osprey. While an Osprey has a wing which is fixed, an engine and a propeller such that the direction is rotated toward the wing front tip, and a wing which does not rotate even if the propeller direction rotates, the present invention is such that a propeller with an engine is fixed to the wing, and also without fixing a wing, it rotates in a propeller direction or along with a rotating wing. As described above, this is different from an Osprey. In addition, in case of Osprey, a wing hits the slip stream of the propeller, reducing the propeller efficiency. However, in case of the present invention, the invention is such that the propeller and wing are always at a right angle, and the wing slants with the same angle as the slant of the propeller, hence the propeller slip stream does not hit the wing, and the propeller slip stream is greatly improved. Moreover, regarding an Osprey, the engine and propeller rotate at the wing tip, hence, vibration, strength and the like create structural problems. With the present invention, since an engine and propeller are fixed solidly on the wing, no structural problems occur. Regarding an Osprey, a rotating engine and propeller are provided on the wing front tip, hence it is necessary to strengthen the wing girder, weight is increased, and aerodynamic performance is reduced. On the other hand, regarding the present invention, since a wing girder is lighter than Osprey's variation, aerodynamic performance is improved. Regarding an Osprey, since the engine and propeller are on the wing tip, resonance is generated by a long span, vibration is significant and orthocentric characteristic is problematic; crash accidents have ultimately occurred due to the vibration. On the other hand, regarding the present invention, the engine propeller is not on the wing front tip, and it is on the center part which has a strong structure; hence no resonance occurs, and it is safe and the orthocentric location is good.

FIG. 13 is a plan view drawing of one example of the $10^{th}$ embodiment. A motor 55 that rotates the wing 57 on a body 53, a motor 56 that rotates the wing 58, a battery 54 that drives motors 55, 56, a vertical tail fin 14, a front main wing 57, a rear main wing 58 are provided, and on front main wing 57 are mounted a propeller motor 7, a propeller 6, and on rear wing 58 are mounted a propeller 6, a drive motor 7', a propeller 6'. FIG. 14 is a drawing that views this embodiment from the front.

FIG. 15 is a is a drawing that views this embodiment from the side. 59 is a landing gear combined cargo holding unit, and in CG 68 of the aerial vehicle, a camera and cargo 60 are designed to be carried, and regardless of the various weights of the cargo, the vehicle is designed so that the vehicle can always fly horizontally. What is important here is that, the motor 7 for the propeller 6 is mounted on the front wing 57 so that wing 57 has the angle attack a 62 against thrust line of the propeller 6. Likewise, just as rear wing 58 also have the angle of attack B, the motor 7' for propeller 6' is mounted. α and β are naturally different angles.

FIG. 16 is a top view drawing in which a front main wing 57 and a rear main wing 58 and the propeller 6, motor 7 for the same, propeller 6', motor 7' for the same that are mounted on the front main wing 57 and rear main wing 58, are rotated 90° by the rotation axis 67 of motor 55 and the rotation axis 70 of motor 56. FIG. 17 is a drawing viewing this from the top. FIG. 18 is a drawing viewing this from the side.

Regarding the aerial vehicle of the present invention, in this state, the propeller 6 is rotated by a motor 7, and the propeller 6' is rotated by a motor 7', and this aerial vehicle vertically takes off and ascends. It is designed such that the slip stream of propeller 6, 6' at this time is not blocked by wings 57, 58 at all. Next, motors 55, 56 are gradually rotated, and centered on the rotation axis 69, 70, the propellers 6, 6', and wings 57, 58 are rotated, and placed in the position of FIG. 18. Thereby, a fuselage is floated by wings 57, 58 and by the propulsion power of propellers 6, 6', it flies horizontally at high speed. If necessary, it is filmed by a camera 60. Upon arriving at the destination, motors 55, 56 rotate in reverse against the previous description, and centered on rotation axis 60, 76, wings 57, 58 and propellers 6, 6' are gradually turned upward, and vertically descends. At this time also, since the propeller slip stream does not interfere with wings, propeller efficiency goes up. FIG. 19 is an embodiment of the present invention in which without using two motors 55, 56 from FIG. 13 to FIG. 18, using only one motor 55, wings 57, 58 are rotated. Thereby, the aerial vehicle can be made lighter in weight. Regarding a motor, a stepping motor is desired. The rotation power 66 of a motor 55 becomes the rotation power 67 via pivot 64 and lever 65 by a lever 61, a pivot 62 and a link beam 63, and rotates axis 70.

FIG. 20 is an embodiment of the present invention different from FIG. 19, and using non reversibility of bevel gear 68, wings 57, 58 are rotated. FIG. 21 and FIG. 22 are other embodiments of the present invention. According to the embodiments of FIGS. 16, 17 and 18, due to the slip stream of the front propeller 6, the efficiency of the rear propeller 6' deteriorates. Hence, these were improved by another embodiments FIG. 21, 22 of the present invention. In this embodiment, since the slip stream of the front propeller 6 is placed outside of the rotation range of the rear propeller 6', the efficiency of the rear propeller 6' does not decrease. FIG. 21 shows the ascent or descent time, and FIG.

22 shows a horizontal flight time. FIG. 23 and FIG. 24 are also other embodiments of the present invention and comprises a single tilt main rotor 69, a torque correction tail rotor 70, a fixed main wing 57 and a fixed tail fin 58.

The present invention can be applied not only to a drone but also to a real airplane. Moreover, in that case, the propeller is rotated by an engine. Moreover, not using a propeller, in case of using jet engines or rockets, it is also included in the present invention.

USAGE POSSIBILITY IN INDUSTRY

The present invention is a new type airplane in which compared with other vertical take-off and landing planes such as a tilt rotatory type like the well-known drones and well-known Ospreys, and helicopter and the like, it is safer with a fast-horizontal speed. Regarding the existing drone, its speed is too slow and it cannot fly a long distance for use in long-distance product transportation such as mail delivery and the like and logistics, and energy consumption is high, hence it is not suitable for use in high-speed delivery. With the present invention, cargo can be delivered with a high speed, and long distance filming is enabled. In the case of the present invention, when applied with a fuselage that seats people, it can be used for quick rescue operations in the mountains and in disasters at sea, hence there is a large case for usability in industry. Regarding aircrafts of the present invention, compared with helicopters, pitch control is not necessary, steering is simple and low-priced, horizontal speed is fast, navigable distances are long, accidents caused by the tilting of Ospreys' rotors is completely gone, and it is safe, hence its usage range is widened. Moreover, if the fuselage is made larger, a large number of people can be seated and it can be serviced for islands without any airport, and this can compensate for the inconvenience of traffic caused to islands' peoples, and there is also great usability for defense and industrial applications. Moreover, if the present invention is flown near the stratosphere, solar energy can be received by wings and converted to microwaves and sent to earth, and used as electric energy on earth, it can be supplied as valuable energy for Japan as a nation without much natural resources, and also it can replace a reconnaissance satellite. Defense and industrial application possibilities are very large.

EXPLANATION OF SYMBOLS

1 Fuselage
2 Main rotor
3 Tail rotor
4 Horizontal tail fin
5 Rotation axis for Osprey engine
6 Drone propeller
6' Same as above (rear part)
7 Drone ascent descent motor
7' Same as above (rear part)
8 Drone propeller guard
9 Receiver, camera and the like
10 Forward-moving propeller
11 Forward-moving propeller motor
12 Main wing
13 Horizontal tail fin
14 Vertical tail fin
15 Main wing girder
16 Ascent descent rudder
17 Wing tip vertical ascent descent rudder
18 Push propeller
19 Push propeller drive motor
20 No tail fin main wing
21 Canard
22 Canard beam
23 Canard type main wing
24 Propeller guard-combined main wing
25 Engines for ascent descent propeller
26 Cockpit
27 Jet or rocket engine
28 Propeller 6 guard-combined canard
29 Propeller 6 guard-combined tail fin
30 Wing tip vertical tail fin
31 Canard type main wing
32 Motor for propeller rotation
33 Engines for Osprey propeller
34 Propellers for Osprey ascent and descent and forward-moving
35 Canard type main wing girder
36 Propeller 6 guard-combined tandem type main wing front wing
37 Propeller 6 guard-combined tandem type main wing rear wing
38 Vertical propeller motor support girder in the tandem type aircraft
39 Vertical propeller rotation track
40 four (4) vertical propeller motor 7-joining beam
41 Square beam with four (4) propeller motor 7 joined
42 Solar panel
43 Tandem type main wing (wing tip propeller attached) front wing
44 Tandem type main wing (wing tip propeller attached) rear wing
45 Body girder
46 Real airplane forward-moving propeller engine
47 Real airplane forward-moving propeller
48 Rotor exclusively for real airplane ascent and descent
49 Main wings exclusively for real airplane horizontal flight
50 Horizontal tail fin exclusively for real airplane horizontal flight
51 Vertical tail fin exclusively for real airplane horizontal flight
52 Engine for rotor exclusively for real airplane ascent and descent
53 Body
54 Battery, electronic circuits and the like
55 Front wing rotation motor (stepping motor)
56 Rear wing rotation motor (stepping motor)
57 Front wing
58 Rear wing
59 Cargo loading-combined landing gear
60 Cargo
61 Rotation conduction lever of motor 55
62 Pivot for the same as above
63 Rear wing rotation-joining beam for the same as above
64 Pivot for the same as above
65 Lever for the same as above
66 Front wing rotation motor rotation direction
67 Rear wing for the same as above
68 Wing rotation bevel gear
69 Tilt main rotor
70 Torque correction tail rotor

The invention claimed is:
1. An aerial vehicle comprising:
a first horizontal flight wing having two first propellers fixed on the first horizontal flight wing, each of the first propellers located at a center portion of a side of the first horizontal flight wing for ascending, descending, and advancing, the first horizontal flight wing configured to rotate vertically for the ascending and the descending using the first propellers, and configured to rotate horizontally with an angle of attack for the advancing and horizontal flight using the first propellers;

a second horizontal flight wing having two second propellers fixed on the second horizontal flight wing, each of the second propellers located at a center portion of a side of second horizontal flight wing for ascending, descending, and advancing, the second horizontal flight wing configured to rotate vertically for the ascending and the descending using the second propellers, and configured to rotate horizontally with an angle of attack for the advancing and horizontal flight using the second propellers; and a combined landing gear and cargo carrier section adjacent to a center of gravity of the aerial vehicle, which serves as both a landing gear and a cargo carrier, wherein the first horizontal flight wing and the second horizontal flight wing are located on a same horizontal plane on a fuselage of the aerial vehicle, the first horizontal flight wing while positioned for horizontal flight has a first angle of attack and the second horizontal flight wing while positioned for horizontal flight has a second angle of attack, and the first angle of attack is a different angle of attack from the second angle of attack.

2. An aerial vehicle comprising:

a first rotatable horizontal flight wing with first propellers for ascending and descending for vertical flight, and advancing for horizontal flight fixed on the first rotatable horizontal flight wing;

a second rotatable horizontal flight wing with second propellers for ascending and descending for vertical flight, and advancing for horizontal flight fixed on the second rotatable horizontal flight wing; and a combined landing gear and cargo carrier section forming a shape having a base portion larger than a top portion and adjacent to a center of gravity of the aerial vehicle, which serves as both a landing gear and a cargo carrier, wherein the first rotatable horizontal flight wing and the second rotatable horizontal flight wing are located on a same horizontal plane on a fuselage of the aerial vehicle, the first rotatable horizontal flight wing while positioned for horizontal flight has a first angle of attack and the second rotatable horizontal flight wing while positioned for horizontal flight has a second angle of attack, and the first angle of attack is a different angle of attack from the second angle of attack.

3. The aerial vehicle of claim 2, having the horizontal flight wing for flying horizontally and a plurality of ascending, descending, and advancing propellers located on either side of the fuselage.

4. The aerial vehicle of claim 2, comprising a plurality of propellers for ascent, descent and forward disposed on left, right, front and rear of the fuselage, and the horizontal flight wings for obtaining lift during horizontal flight are provided not to interfere with a slipstream of the ascending, descending and advancing propeller.

5. The aerial vehicle of claim 2, wherein at least a portion of a plurality of ascent, descent and forward propellers are provided between the horizontal flight wings, so that the horizontal flight wings serve as guards for the plurality of ascent, descent and forward propellers.

6. The aerial vehicle of claim 2, wherein the aircraft including a main wing forward tail wing rearward type, a tailless type, a tail wing forward main wing to rearward type, a same main wing forward and rearward type.

7. The aerial vehicle of claim 2, further comprising a solar battery on a wing surface.

8. The aerial vehicle of claim 2, wherein the combined landing gear and cargo carrier section forms a shape having a base portion larger than a top portion.

* * * * *